United States Patent [19]
Rondinelli

[11] Patent Number: 5,730,681
[45] Date of Patent: Mar. 24, 1998

[54] VARIABLE-SPEED DRIVE, PARTICULARLY FOR VEHICLES

[76] Inventor: Antonio Rondinelli, Via B. Spaventa, 20, 10134 Torino, Italy

[21] Appl. No.: 596,233

[22] PCT Filed: Aug. 18, 1994

[86] PCT No.: PCT/IT94/00137
§ 371 Date: May 1, 1996
§ 102(e) Date: May 1, 1996

[87] PCT Pub. No.: WO95/06209
PCT Pub. Date: Mar. 2, 1995

[30] Foreign Application Priority Data

Aug. 20, 1993 [IT] Italy .............. TO93A0625

[51] Int. Cl.$^6$ .............................................. F16H 15/44
[52] U.S. Cl. .............................................................. 476/55
[58] Field of Search ........................................ 476/53, 55

[56] References Cited

U.S. PATENT DOCUMENTS 2,642,749  6/1953  Wood ............................. 476/55 X
5,575,734  11/1996  Rondinelli ........................ 476/55

FOREIGN PATENT DOCUMENTS 902 204    1/1954  Germany .
447259     8/1950  Italy .............................. 476/55
WO 93/05318  3/1993  WIPO .

Primary Examiner—Allan D. Herrmann
Attorney, Agent, or Firm—Gary M. Nath; Harold L. Novich; Nath & Associates

[57] ABSTRACT

A variable-speed drive (1) wherein a connecting assembly (15) for continuously varying the velocity ratio of two shafts (6,7) presents a bell (37) with a respective axis (8); a ring of conical rollers (16) housed inside the bell (37) and each defined by a respective outer lateral surface (18) cooperating with the inner surface (38) of the bell (37) at one point of tangency (P); and a control member (44) housed inside the ring of rollers (16) and movable both ways along the axis (8) of the bell (37) so as to rock the rollers (16) in relation to the bell (37) and shift the points of tangency (P) along the generating lines of respective rollers (16).

13 Claims, 2 Drawing Sheets

5,730,681

1

VARIABLE-SPEED DRIVE, PARTICULARLY FOR VEHICLES

TECHNICAL FIELD

The present invention relates to a variable-speed drive, particularly for vehicles.

BACKGROUND ART

According to German Patent n. 902 204, a variable-speed drive is formed comprising a central conical roller rotating about a respective axis and defined by a convex surface, and a number of outer conical rollers tangent to, opposed in relation to, and arranged in a ring about the central roller, and defined by respective concave lateral surfaces. The outer conical rollers rock in relation to the central roller to vary the velocity ratio of the drive by means of a control ring surrounding the outer conical rollers, movable along said axis, and presenting an inner surface mating in sliding manner with the lateral surfaces of the outer rollers.

Known variable-speed drives of the above type present several drawbacks, all due to the fact that, by virtue of the control ring mating in sliding manner with the outer rollers, a clutch is required for disconnecting the drive from the load prior to varying the velocity ratio, and for reconnecting the drive to the load once the velocity ratio is varied.

The above problem is solved, for example, by the variable-speed drive described and illustrated in Patent Application WO-A-93/05318 filed on 12 Aug., 1992, by the present Applicant, and wherein the control ring is replaced by a ring of balls also movable along the axis of the inner roller and interposed between the lateral surfaces of the outer rollers and a reaction element defined by a sleeve coaxial with and movable both ways along the axis of the inner roller.

Variable-speed drives of the above type, however, are relatively cumbersome due to the presence of said sleeve which, among other things, being movable, must be housed inside a protective casing.

Such drawbacks may be solved by replacing the sleeve with a number of reaction assemblies, one for each said ball, presenting respective rolling bodies cooperating with the respective balls, and supported by a single ring movable axially along said axis.

Though satisfactorily solving the size problem of the drive, such a design is relatively complex and expensive to produce due to the numerous-parts involved.

DISCLOSURE OF INVENTION

It is an object of the present invention to provide a variable-speed drive designed to overcome the aforementioned drawbacks and which, at the same time, is both straightforward and economical to produce and provides for a high degree of reliability.

According to the present invention, there is provided a variable-speed drive, particularly for vehicles, as defined in claim 1.

BRIEF DESCRIPTION OF THE DRAWINGS

A non-limiting embodiment of the present invention will be described by way of example with reference to the accompanying drawings, in which.

2

Figure 3:
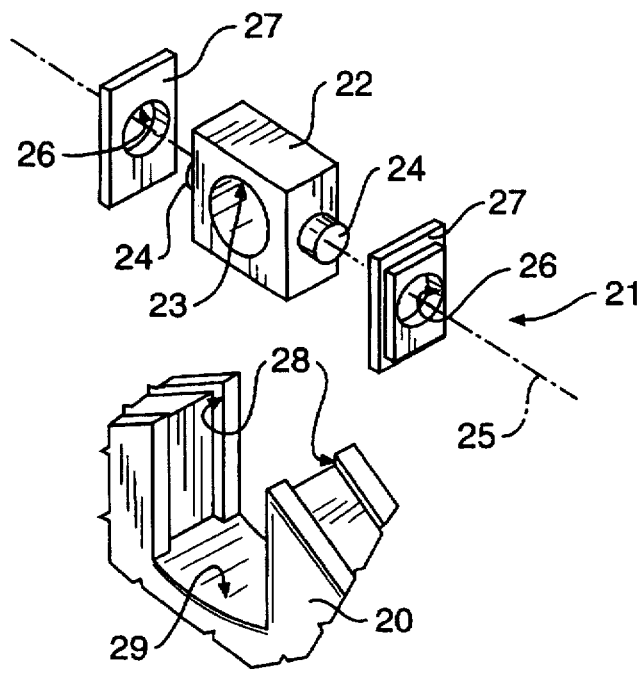
Figure 2:
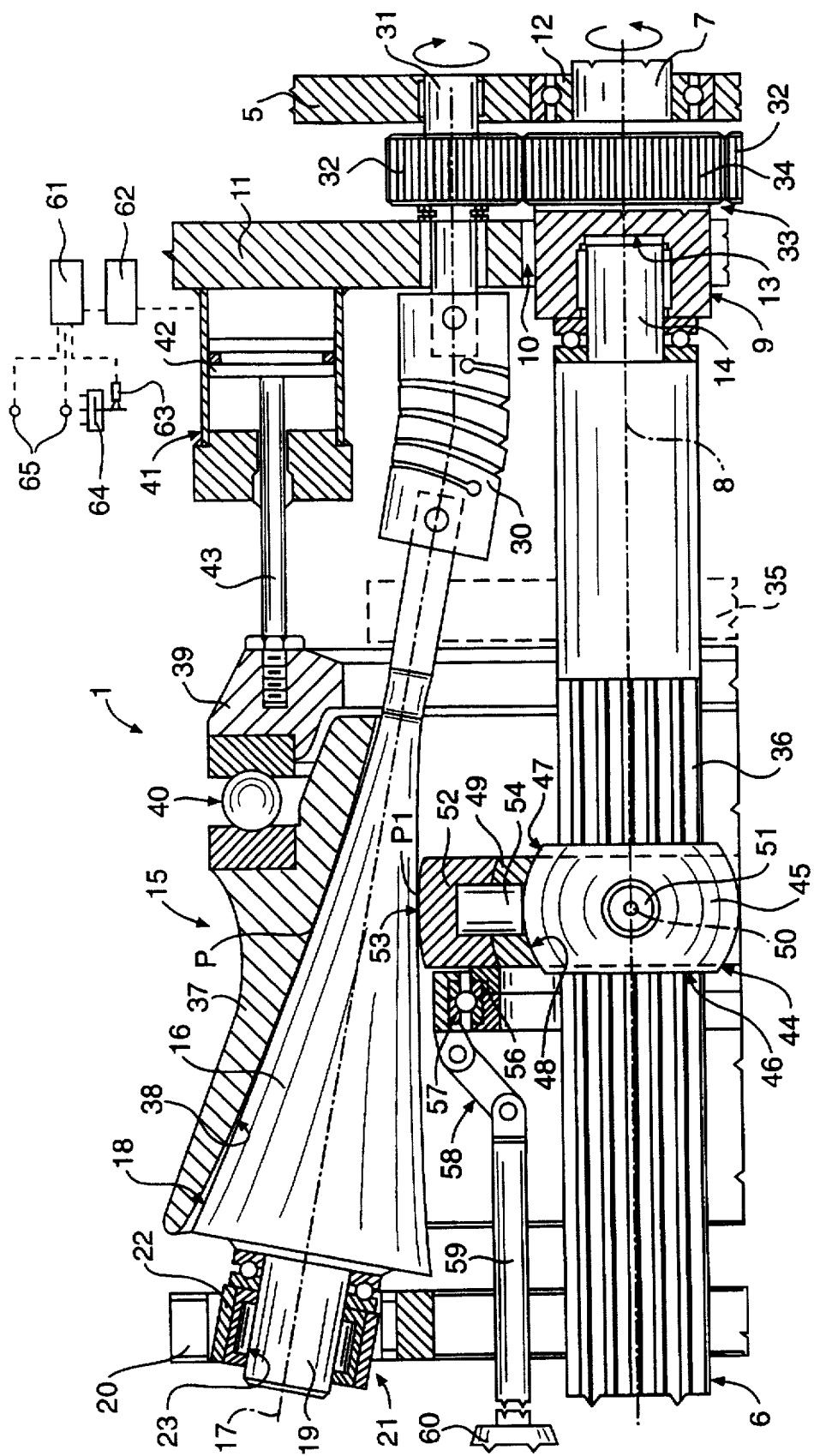
FIG. 2 shows a larger-scale section of a detail in FIG. 1.

FIG. 3 shows an exploded view in perspective of a detail in FIG. 2.

BEST MODE FOR CARRYING OUT THE INVENTION

Figure 1:
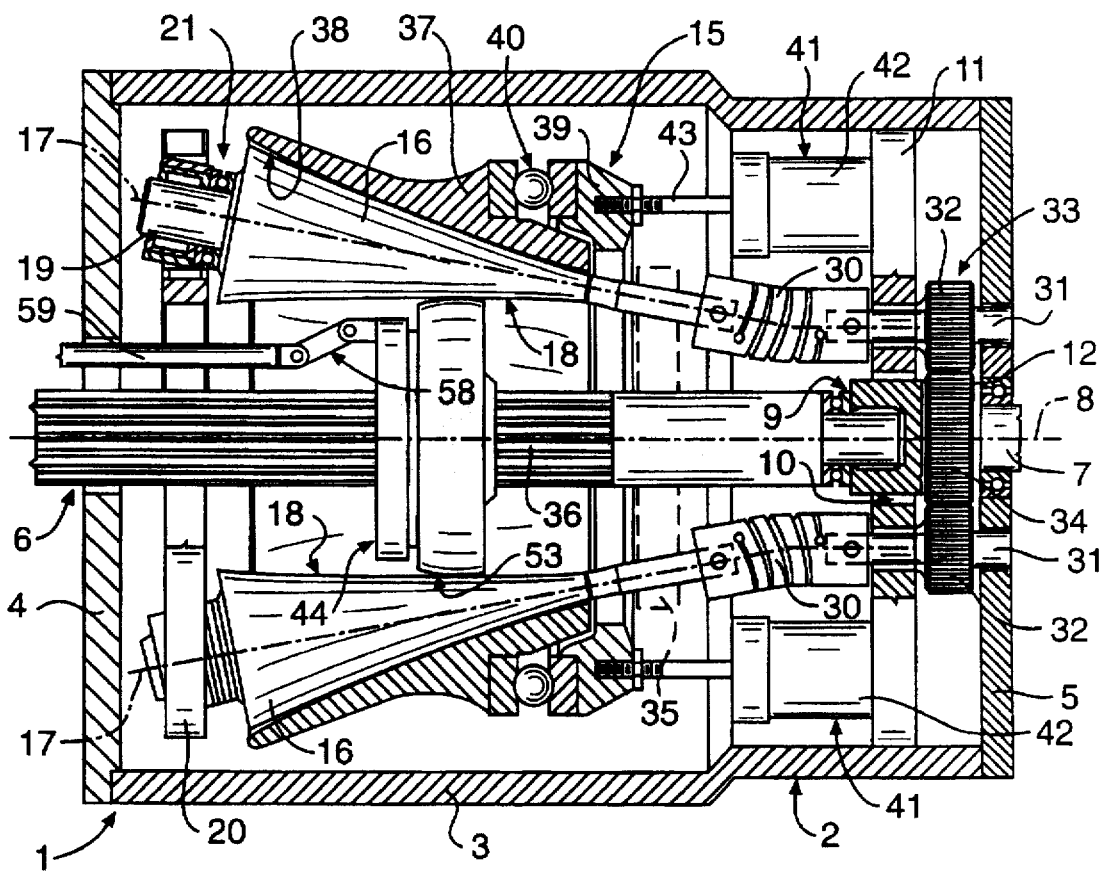
FIG. 1 shows a section of a preferred embodiment of the variable-speed drive according to the present invention.

Number 1 in FIG. 1 indicates a variable-speed drive for vehicles, particularly motor vehicles, comprising an outer casing 2 in turn comprising a tubular body 3 and two plates 4 and 5 closing the opposite ends of body 3. Plates 4 and 5 are fitted through with two propeller shafts 6 and 7 aligned with each other and coaxial with an axis 8 substantially perpendicular to walls 4 and 5. Shaft 7 rotates clockwise in FIG. 2, and comprises an end portion 9 projecting inside casing 2 through a hole 10 formed through a plate 11 connected, inside casing 2, to body 3 and parallel and adjacent to plate 5. Portion 9 is connected in rotary and axially-fixed manner to plate 5 by means of a bearing 12, and presents a dead hole 13 coaxial with axis 8 and engaged in rotary and axially-fixed manner by an end portion 14 of shaft 6.

Shafts 6 and 7 are connected angularly integral with each other by means of a connecting assembly 15 housed inside casing 2 and which provides for continuously varying the velocity ratio of shafts 6 and 7. Assembly 15 comprises a ring of conical rollers 16, each rotating about a respective axis 17 sloping towards axis 8 and portion 9 of shaft 7, each tapering towards plate 11, and each defined laterally by a concave surface 18 with a given curve radius.

More specifically, at the end facing plate 4, each roller 16 terminates with a cylindrical pin 19 fitted to a supporting disk 20—common to all of rollers 16 and perpendicular to axis 8—by means of a respective connecting device 21 (FIGS. 2 and 3) enabling respective roller 16 to rotate about axis 17, respective pin 19 to move in a direction perpendicular to axis 8, and hence respective roller 16 to rock in relation to shaft 6. As shown particularly in FIG. 3, each device 21 comprises a parallelepiped body 22 which presents a central hole 23 engaged in rotary and axially-sliding manner by a respective pin 19, and two pins 24 extending on either side of body 22, coaxial with an axis 25 perpendicular to axes 8 and 17, and engaging in rotary manner respective holes 26 formed in a pair of pads 27. Pads 27 engage in sliding manner respective radial guides 28 formed inside respective slots 29 spaced along the outer periphery of disk 20.

At the opposite end to that connected to disk 20, each roller 16 is connected, via the interposition of a helical joint 30, to a respective pin 31 extending in axially-fixed manner between plates 5 and 11 and parallel to shaft 6, and rotating clockwise in. FIG. 2 in relation to plates 5 and 11. Each pin 31 is fitted with a respective straight-toothed gear 32 forming part of a drive 33 also comprising a central straight-toothed gear 34 fitted to portion 9 and meshing with gears 32. According to a variation not shown, joints 30 are replaced by double universal joints, and assembly 15 also comprises a further disk 35 (shown by the dotted line in FIGS. 1 and 2) perpendicular to axis 8 and to which respective end portions of rollers 16 are connected by means of respective devices (not shown) similar to devices 21.

Again with reference to FIGS. 1 and 2, rollers 16 and an intermediate portion 36 of shaft 6 are housed inside a conical bell 37 rotating, in relation to casing 2, about its own axis coincident with axis 8, and defined internally by a convex surface 38 coaxial with axis 8 and tangent to each surface 18 at one point of contact P. The inside radius of bell 37 decreases towards the end facing plate 11, and bell 37 is forced into contact with surfaces 18 by an angularly-fixed thrust ring 39 connected to bell 37 by a bearing 40. Ring 39 is moved along axis 8 by a number of double-acting hydraulic jacks 41 (only two shown in FIG. 1), each comprising a body 42 connected integral with plate 11, and an output rod 43 with a threaded end portion engaging in adjustable manner a respective threaded hole formed in ring 39.

The position of rollers 16 in relation to bell 37 is varied by a control member 44 forming part of assembly 15 and housed inside the ring of rollers 16, and which provides for rocking rollers 16 in relation to bell 37 and varying the velocity ratio of shafts 6 and 7.

In the example shown, member 44 is in the form of an ordinary universal joint, and comprises a central core 45 defined laterally by a spherical surface 47 and fitted to portion 36 of shaft 6 in axially-sliding manner by means of a splined coupling 46. The inner surface 48 of an intermediate ring 49 slides in contact with surface 47, which ring 49 is connected to core 45 so as to rotate about an axis 50 perpendicular to axis 8 and to the FIG. 2 plane by means of a pair of pins 51 (only one shown in FIG. 2) extending on either side of core 45. Ring 49 supports an outer ring 52 defined internally by a surface complementary to the outer surface of ring 49, and externally by a spherical surface 53 tangent to each surface 18 at one point of contact P1. Ring 52 is connected to ring 49 by a pair of pins 54 perpendicular to and interposed between pins 51, and is fitted integral with an axial sleeve 56 extending towards plate 4 and to which is connected, via the interposition of a bearing 57 and a known toggle 58, the output rod 59 of a linear actuator 60 (FIG. 2) for varying the axial position of member 44 along axis 8.

Finally, variable-speed drive 1 comprises a number of nozzles (not shown) for feeding oil, preferably atomized mineral oil, into casing 2; and a known control system 61 for controlling a known unit 62 in turn controlling jacks 41. More specifically, system 61 provides for controlling unit 62 and so varying the axial positions of rods 43 of jacks 41 as a function of both the load condition of drive 1 and the conditions, e.g. temperature and viscosity, of the lubricating oil. For which purpose, control system 61 is connected to a first sensor 63 connected to a manually operated selector 64 for selecting the operating conditions of drive 1; and to a number of further sensors 65 (only two shown schematically in FIG. 2) housed inside casing 2 and connected to the input and output shafts of drive 1.

In actual use, operation of actuator 60 provides for rotating ring 52 in relation to core 45 about the axes of pins 51 and 54, and so varying the axial position of core 45 in relation to shaft 6; which displacement of core 45 along portion 36 of shaft 6 causes rollers 16 to rock in relation to bell 37, thus varying the position of contact points P between surfaces 18 and 38 along the generating lines of rollers 16, and so varying the velocity ratio of shafts 6 and 7.

Also, alongside a variation in the operating conditions of drive 1, and in the condition of the oil lubricating the parts of drive 1 moving in relation to one another, control system 61 activates unit 62 which in turn operates jacks 41 to move ring 39, vary the axial position of bell 37 in relation to the ring of rollers 16, and so vary the pressure at said contact points P and P1.

As such, the particular arrangement of the component parts of drive 1 as described above, and more especially the location of control member 44 inside the ring of rollers 16, provides for achieving a variable-speed drive which, as compared with known drives, is extremely compact, straightforward in terms of both design and operation, and relatively cheap to produce.

The above design of drive 1 also provides for achieving a relatively high degree of efficiency, and more specifically in the order of 80% at an operating temperature of roughly 80° C.

As for application of drive 1, both shaft 6 and shaft 7 may be connected indifferently to an input drive shaft (not shown) without affecting either the efficiency or reliability of drive 1.

Clearly, changes may be made to variable-speed drive 1 as described and illustrated herein without, however, departing from the scope of the present invention.

For example, as opposed to being coaxial as in the example shown, shafts 6 and 7 may be offset axially by varying drive 33; and, as opposed to transmitting motion as in the example shown, shaft 6 may provide solely for supporting and guiding member 44, in which case, member 44 may be simplified and, in particular, consist of a straightforward spherical body rotating and moving axially in relation to shaft 6.

Finally, said input drive shaft (not shown) or an output shaft (not shown) may be connected to bell 37, for example, by means of a gear drive (not shown), in which case both joints 30 and drive 33 may be eliminated. As in this case, however, the ring of rollers 16 would be idle in relation to casing 2, and more specifically would constitute the planet gears of an epicyclic train, to enable motion to be transmitted, the ring of rollers 16 must again be locked in an angularly fixed position in relation to casing 2, for example, by connecting disk 20 and/or disk 35 to casing 2 or, conveniently, by interposing a clutch (not shown) between disk 20 and casing 2, which latter solution provides for smooth, gradual break-away by gradually engaging the clutch.

I claim:

1. A variable-speed drive (1) comprising a first (6) and a second (7) shaft and means (15) for connecting the shafts (6, 7) and varying the velocity ratio of the shafts (6, 7) continuously; said connecting means (15) comprising a ring of elongate bodies of revolution (16) having respective curved lateral surfaces (18), control means (44) and a body (37) presenting a respective axis (8) and defined by a curved surface (38) coaxial with said axis (8), the curved lateral surfaces (18) of said elongated bodies (16) rolling on said curved surface (38); characterized in that said body (37) is a tubular body and said curved surface (38) is an inner surface of said tubular body (37); said ring of elongate bodies (16) is housed in said tubular body (37); said control means (44) are located inside said ring of elongate bodies (16), for causing the lateral surface (18) of each elongate body (16) to cooperate with the inner surface (38) of said tubular body (37) at a respective sole point of tangency (P) movable along a generating line of the relative elongate body (16) by engaging with the lateral surface of each elongate body; and in that forcing means (39, 41) are provided for forcing said curved surface (38) against the respective curved lateral surfaces (18) at said points of tangency (P).

2. A variable-speed drive as claimed in claim 1, wherein said inner surface (38) of said tubular body (37) is a convex surface, and said lateral surfaces (18) of said elongated bodies (16) are concave surfaces.

3. A variable-speed drive as claimed in claim 1, wherein said tubular body is defined by a conical bell (37) with an inside radius decreasing towards an axial end of the bell (37); and said elongated bodies are defined by conical rollers (16) tapering towards said axial end of the bell (37).

4. A variable-speed drive as claimed in claim 3, wherein said control means comprise a control member (44) movable along said axis (8) and defined, on the side facing said elongated bodies (16), by an outer surface (53) cooperating with the lateral surface (18) of each elongated body (16) at a respective sole point of tangency (P1); and actuating means (58, 60) for moving the control member (44) in relation to the tubular body (37) and along said axis (8).

5. A variable-speed drive as claimed in claim 4, wherein said outer surface (53) of said control member (44) is a spherical surface.

6. A variable-speed drive as claimed in claim 5, wherein said control member (44) comprises a central core (45) movable axially along said axis (8); and an outer annular body (52) defined externally by said outer surface (53); said annular body (52) being connected to said core (45) so as to rotate in relation to the core (45) about at least two axes (50)(54).

7. A variable-speed drive as claimed in claim 6, wherein said actuating means (58, 60) comprise a linear actuator (60), and toggle means (58) interposed between the linear actuator (60) and said annular body (52).

8. A variable-speed drive as claimed in claim 1 wherein said forcing means (39, 41) comprise at least one linear actuator (41) acting on said tubular body (37).

9. A variable-speed drive as claimed in claim 8, wherein it comprises control means (61, 62) for controlling said linear actuator (41).

10. A variable-speed drive as claimed in claim 1 wherein said tubular body (37) rotates about said respective axis (8) and in relation to said forcing means (39, 41) and said ring of elongated bodies (16).

11. A variable-speed drive as claimed in claim 4 wherein said first shaft (6) extends inside said tubular body (37) and coaxially with said axis (8), and defines a support and guide for said control member (44); and in that it comprises a drive (33) connecting said elongated bodies (16) to said second shaft (7).

12. A variable-speed drive as claimed in claim 11, wherein it comprises joint means (30) interposed between said drive (33) and each of said elongated bodies (16).

13. A variable-speed drive as claimed in claim 1, wherein said first (6) and second (7) shafts are aligned and coaxial with each other.

* * * * *